Dec. 6, 1955  A. WULLSCHLEGER  2,725,970
TRANSPORTER
Filed Sept. 26, 1951  3 Sheets-Sheet 1
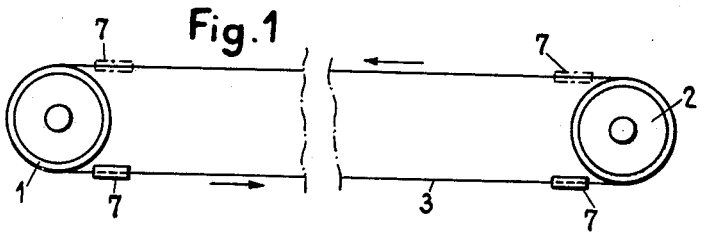
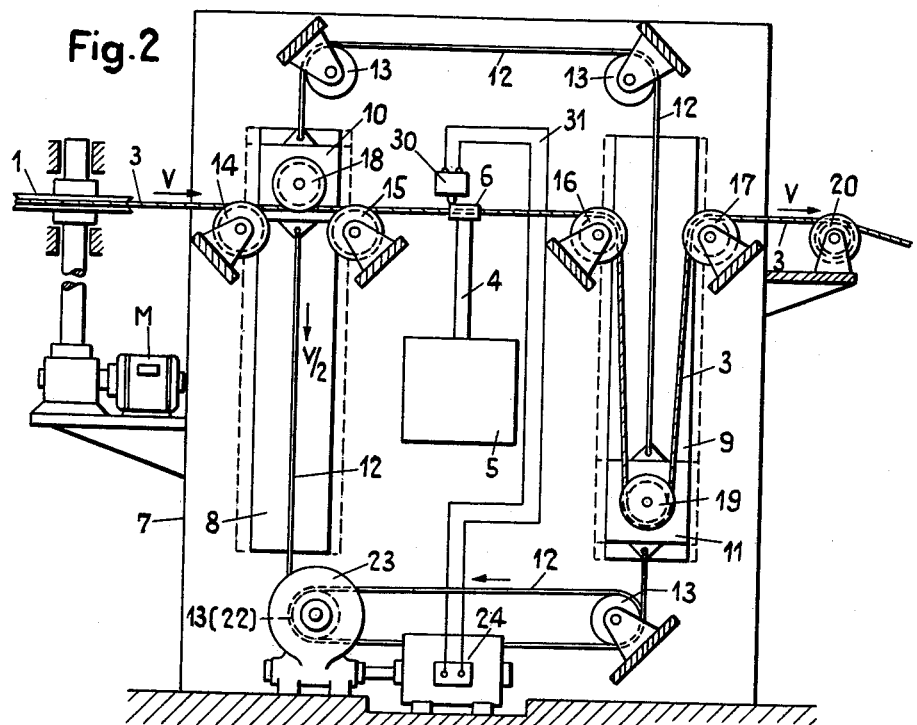
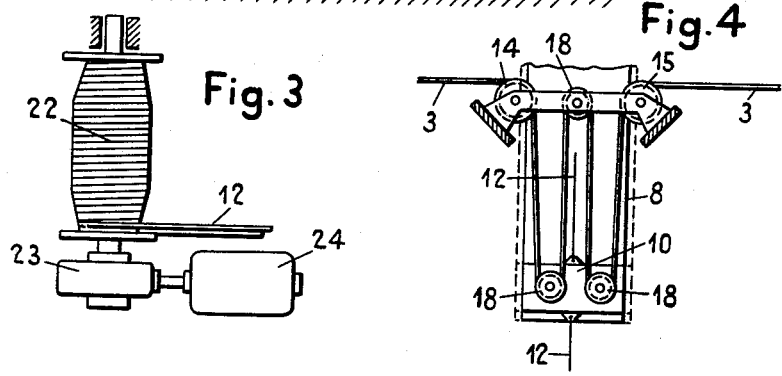
Inventor:
August Wullschleger,
by Ginger, Stern & Carlberg
Attorneys.

Dec. 6, 1955 A. WULLSCHLEGER 2,725,970
TRANSPORTER
Filed Sept. 26, 1951 3 Sheets-Sheet 2
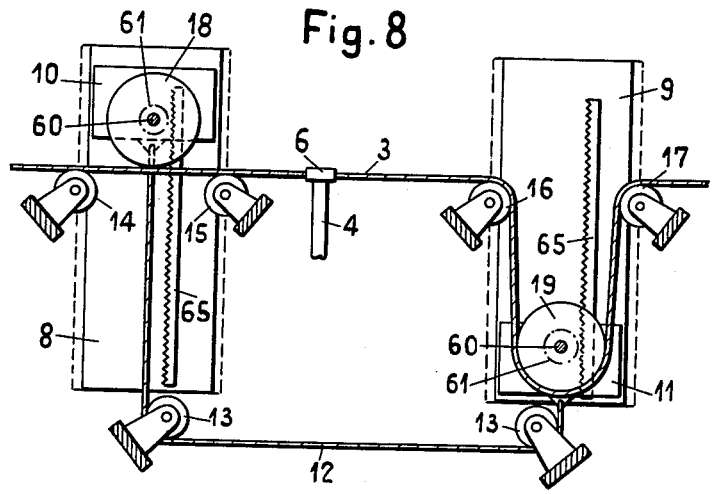
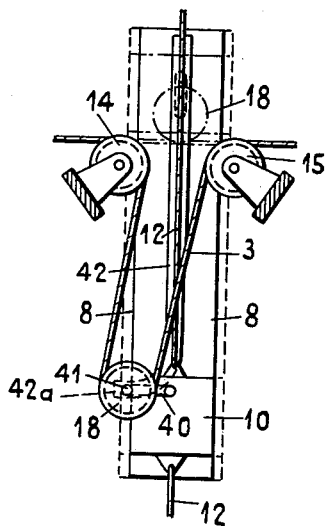
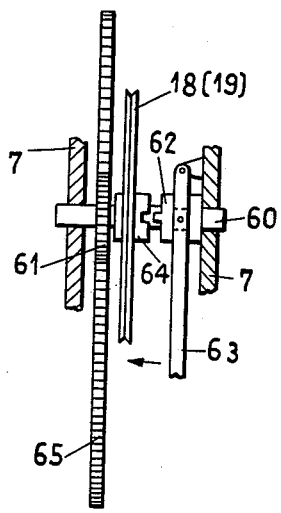
Inventor:
August Wullschleger,
by Singer, Stern & Carlberg
Attorneys.

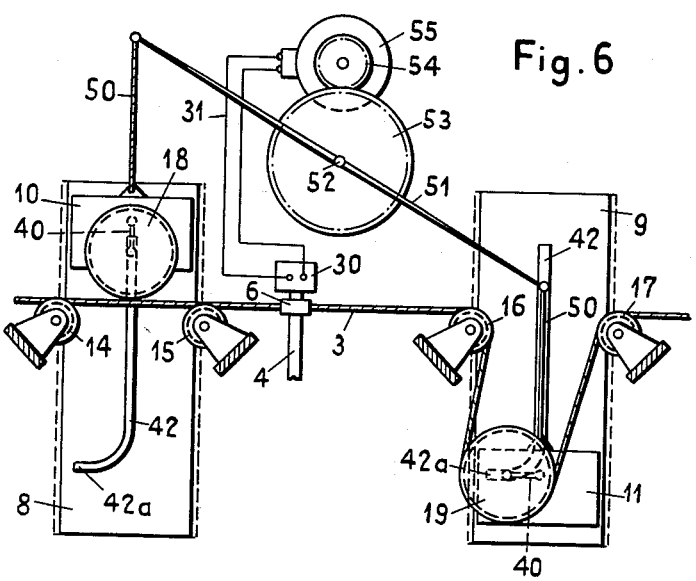
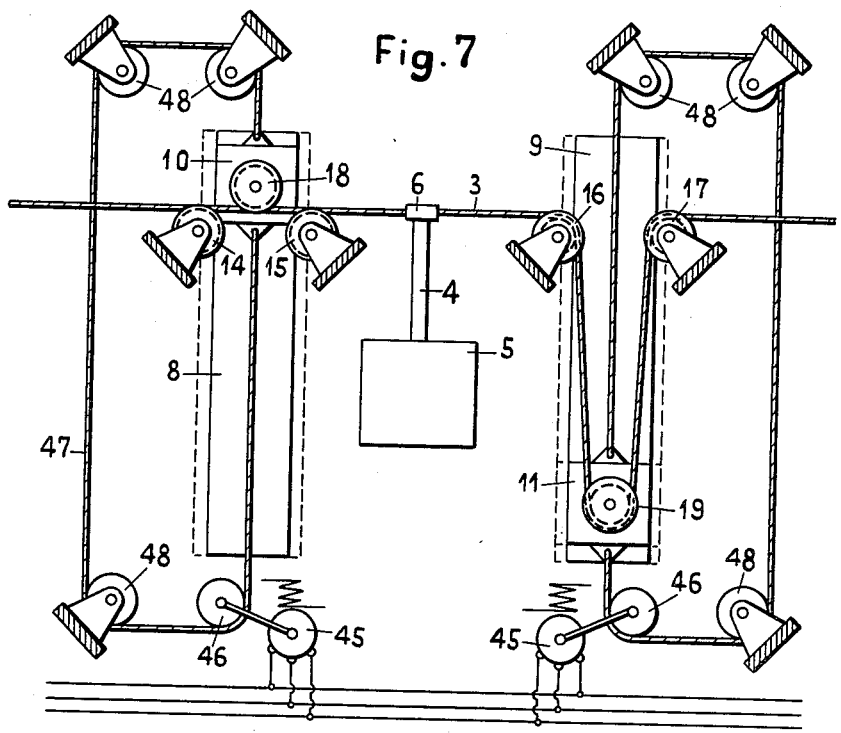

2,725,970
TRANSPORTER
August Wullschleger, Olten, Switzerland

Application September 26, 1951, Serial No. 248,300

8 Claims. (Cl. 198—19)

In the transporters hitherto known for the conveyance of either goods or passengers, two basic types are distinguished. In one of these basic types the suspension tackle of the container or car containing the goods or passengers to be transported is permanently secured to the traction member, for instance a traction cable, which traction member runs continuously or intermittently. In the former case the transport container or car must be loaded and unloaded whilst it is in motion, whilst in the latter case the braking and acceleration of the entire transporter system entailed by the periodic halts results in considerable wastage of power and reduces the capacity of the transporter. It is true that the permanent attachment of the suspension tackle to the traction member ensures less heavy stressing of the latter.

In the second type of embodiment the container is automatically or manually detached from the traction member for loading and unloading purposes, and is then recoupled to said traction member. This constant coupling and uncoupling entails, however, relatively heavy wear on the expensive wire cables which generally constitute the traction members. Moreover, the transfer of the suspension tackle on stationary rails necessitates the services of auxiliary staff, with the result that the operation of such a transporter is rendered more costly.

The object of the present invention is to combine the advantages of both systems without their drawbacks.

The annexed drawing illustrates diagrammatically a preferred embodiment of the invention. In the drawing:

Fig. 1 shows a transporter in plan;
Fig. 2 shows a portion of the transporter in elevation;
Fig. 3 shows a detail and
Fig. 4 a variant.
Figs. 5, 6, 7, and 8 show elevations similar to Fig. 2 of four modified embodiments, and
Fig. 9 is a partial cross sectional view of the embodiment shown in Fig. 8.

The circulating cableway shown in Fig. 1 exhibits the conventional cable sheaves 1 and 2, one at each end station. The traction member, e. g. a traction cable 3, is taken round said sheaves. In the embodiment illustrated, the traction cable serves simultaneously both as the carrying cable and as the traction cable, since the suspension tackle 4 of the transport container 5, which may also take the form of a passenger car, is permanently connected to the traction member by a clip 6. Disposed in the vicinity of sheave 1 is a deflecting device 7 for the traction member 3. The deflecting device (Fig. 2) has two guides 8 and 9 in each of which a sliding member, 10 and 11 respectively, is slidingly arranged. Said sliding members or slides are interconnected by a connecting member 12, e. g. a wire cable. The wire cable 12 is guided over sheaves 13 mounted in the frame of the cable-deflecting arrangement 7. Also rotatably mounted in said cable-deflecting arrangement are four deflecting sheaves 14 to 17 for the traction member 3. The slides 10 and 11 are each provided with a further deflecting sheave, 18 and 19 respectively. Where a difference in altitude has to be overcome, the traction member 3 preferably approaches the open stretch of the transporter over a guide roller 20.

One of the lower sheaves 13 is preferably replaced by a drum 22 tapering inwards at either end (Fig. 3). This drum is driven by a motor 24 via gearing 23. As Fig. 2 shows, the wire cable 12 coming from the sliding member 10 is taken round the drum to the other bottom sheave 13, round the latter back to the drum and then back to the same lower sheave and via the latter to the slide 11.

As Fig. 4 shows, it is also possible to provide two (or even more) sheaves 18 for guiding the traction member 3 in each of the two slides 10 and 11.

The following is the manner in which the described transporter functions:

As the traction member 3, which is set in motion by, for instance, the sheave 1 driven by the motor M, moves, the suspension tackle 4 travels round the sheave 1 and over the two sheaves 14 and 15. As soon as the clip 6 has left the sheave 15, an electrical circuit 31 is closed by the switch 30 operated by the clip 6. As a result, the motor 24 is switched on and the wire cable 12 accordingly, through the gearing 23 and the drum 22, set in motion in the direction indicated by the arrow (Fig. 2). The slide 10 accordingly slides downwards in its guides 8, whilst the slide 11 is at the same time lifted in its guides 9. The sheave 18 consequently pulls the traction member 3 downwards between the sheaves 14 and 15, whilst the sheave 19, on rising, allows that part of the traction member 3 which is lapped round it to run off freely. Assuming that the traction member 3 moves forward in the direction of the arrow at a speed $v$, then the slide 10, with the sheave 18, will have to move downwards at a speed $v/2$ in order to ensure that that portion of the traction member 3 which is suspended between the sheaves 15 and 16 will remain stationary to permit of loading or unloading. As soon, however, as the slide 10 reaches its lower, and therefore the slide 11 its upper end position, both slides stop, whereupon that portion of the traction member 3 which is suspended between the sheaves 15 and 16 is reset in motion. The traction member 3 lies in a straight line over the sheaves 16 and 17, whilst sheave 19 is located above the traction member 3. As the traction member 3 continues to move, therefore, the clip 6 passes without hindrance over the sheaves 16, 17 and 20. As soon as the clip 6 leaves the sheave 17 the gearing 23 is reversed, with the result that the slide 10 is moved upwards and the slide 11 downwards again, into the positions shown in the drawing. In this position, the clip 6 of the next suspension tackle 4 is able to slide over the sheaves 14 and 15, after negotiating which it likewise is halted between the sheaves 15 and 16.

Means are also provided to ensure that, as the sheave 18 is lowered, that section of the traction member 3 which is suspended between the sheaves 15 and 16 is not halted suddenly, thereby causing the container 5 to swing. At the beginning of the rotary movement of the drum 22, the wire cable 12 is at one end of said drum. As, however, this end has a smaller diameter than the cylindrical portion of the drum, the initial speed of the slide 10 is not $v/2$, but less than $v/2$, with the result that the suspension tackle 4 does not halt abruptly, but is gradually reduced in speed. When the wire cable 12 reaches the cylindrical portion of the drum 22, the slide 10 lowers at the speed $v/2$, with the result that the suspension tackle 4 remains stationary. As the drum 22 continues to rotate, the wire cable 12 reaches the tapered section of said drum at its other end, with the consequence that the suspension tackle with the container 5 is gradually set in motion and has reached the full speed $v$ when the slide 10 reaches its lowermost position.

Guidance of the sheave 18 in the manner shown in Fig. 5 will be found particularly expedient. Said sheave 18 is not rotatably mounted on the slide 10, but on a link member 40. The link member 40, in turn, is swivellingly arranged on the slide 10. The axle 41 of the sheave 18 projects on at least one side into a guide slot 42 provided in the frame 7, which guide slot ends at the bottom in a curve 42a.

On the downward movement of the slide 10, the link member 40 is, on reaching the curve 42a, deflected from its vertical position into the horizontal position shown in the drawing. This arrangement affords two material advantages. In the first place, the way of the sheave 13 measured in vertical direction decreases gradually, with the result that such a length of cable is accumulated as is released by the slide 11 with the sheave 19. The result of this arrangement is that while the slides 10, 11 move within 7, the cable 3 outside the sheaves 14 and 17 is entirely at rest. The lengthwise movement of the traction member 3 is only influenced by the drive of the sheave 1. The force exerted by the traction member 3 on the sheave 18 is furthermore transmitted successively to the frame 7 that is in the same extent as the traction on sheave 19 of slide 11 decreases. The advantage of this system is that the closed system of the cable 12 is approximately balanced in every position. This has an extremely favourable effect on the entire drive system. Needless to say, the sheave 19 is guided in the same way in a second guide slot 42.

Instead of the endless traction member, it is also possible to use a system of levers to interconnect the two slides 10 and 11. Such an arrangement is shown in Fig. 6. This embodiment is suitable, however, only when the transport container 5 is required to remain stationary only for a very short time. In this case the travel of the slides 10 and 11 is short. A connecting rod 50 is articulated to each of said slides 10 and 11, the upper ends of which connecting rods 50 are connected to a two-armed lever 51. The lever 51 is secured to a shaft 52 which carries, for example, a gearwheel 53 to operate the lever 51. A further gearwheel 54 driven by a motor 55, meshes with the gearwheel 53. The motor 55 is likewise preferably controlled by the switch 30 and, by tilting the lever 51, encompasses the upward and downward movement of the slides 10 and 11 previously described.

Another possibility is to actuate each slide separately by synchronized drive motors, as is shown in Fig. 7. Needless to say, the important point is that the slides 10 and 11 should move at exactly equal speed each in a contrary direction to the other. For this purpose two synchronous motors 45 are provided, one of which co-operates with the slide 10 and the other in the same way with the slide 9. Each motor 45 drives a pulley 46 over which a traction member 47 is led. The latter at the same time runs over further deflecting sheaves 48 which are mounted for free rotation in the frame. The traction member 47 is rigidly connected to the slide 10. When the motors 45 are started up, the slides 10 and 11 are displaced in contrary directions. When the slides have reached the ends of their respective operative travel, the direction of rotation of the sheaves 46 is reversed.

This can be effected either by providing a reversing gear between each of the motors 45 and its corresponding sheave 46, or by reversing the motors. The slides 10 and 11 could also, as shown in Figs. 8 and 9, be driven by the traction member 3. For this purpose a gearwheel 61 is secured to the axle 60 which carries, mounted for free rotation, the sheaves 18 and 19 respectively. Also mounted on each axle 60 is a coupling member 62 which is not rotatable but is capable of axial displacement. Said coupling member 62 can be shifted, for example by means of a fulcrumed lever 63, until it engages with the claws 64 of the sheave 18 or 19, as the case may be. As soon as members 62 and 64 engage, the gearwheel 61 is set in rotation by the sheave 18 or 19 via the members 64, 62 and 60. The gearwheel 63 is in permanent engagement with the fixed rack 65 and therefore, on rotation, encompasses a displacement of the slide 10 or 11 as the case may be.

The invention can be used both in cases where the carrier cable also serves as the traction cable, and in cases where a separate traction cable is employed. The only essential point is that the traction member, which may be a cable or a chain, can be locally halted, whereby the suspension tackle and the transporter cab or container are likewise arrested in their motion. The duration of such halt depends on the length of travel of the slides.

The advantage of the invention resides in the fact that the suspension tackle no longer has to be coupled to or uncoupled from the traction cable, and that although the suspension tackle can be halted in its motion for a predetermined interval of time, its drive means continue to run. In this way the traction cable is given gentle treatment, and human labour can be economized through the fact that the slides are displaced automatically. It is possible to design the entire transporter for fully automatic operation.

The two slides moving in contrary directions may also be so controlled that the transporter container or car merely slows down and reaccelerates at the loading and discharge stations, instead of coming to a complete halt, should the adhesion of cable 3 on sheave 1 prove insufficient to positively drive the sheaves 14 and 17.

What I claim is:

1. In a transportation device, an endless flexible traction member, rotatable sheaves on which said traction member is mounted, means for driving said traction member, guide members in engagement with said traction member, at least two of said guide members being grouped together with a station on the transportation path between them, a guide for each of said guide members substantially transverse to said transportation path, and means independent of said driving means for sliding said guide members along said guides to form said traction member into loops the combined total length of which is constant, while the direction of movement of a pair of said guide members is such as to increase the length of the loop formed by one of said two guide members while correspondingly decreasing the length of the loop formed by the other guide member, whereby the speed of the portion of the traction member between said two guide members may be varied independently of the speed of other portions of said traction member, and actuating mechanism for said slides to cause said slides to move in opposite directions simultaneously in each pair of said guide members.

2. In a transportation device, an endless flexible traction member, rotatable sheaves supporting said traction member, means for driving said traction member, at least two guide members, pulleys rotatably mounted on said guide members for engagement with said traction member, at least two or said guide members being grouped together with a station on the transportation path between them, a guide for each of said guide members substantially transverse to said transportation path, and means independent of said driving means for sliding said guide members along said guides to form said traction member into loops the combined total length of which is constant, while the direction of movement of a pair of said guide members is such as to increase the length of the loop formed by one of said two guide members while correspondingly decreasing the length of the loop formed by the other guide member, whereby the speed of the portion of the traction member between said two guide members may be varied independently of the speed of other portions of said traction member, and actuating mechanism for said slides to cause said slides to move in opposite directions simultaneously in each pair of said guide members.

3. In a transportation device, an endless flexible traction member, rotatable sheaves supporting said traction member, means for driving said traction member, guide members, pulleys rotatably mounted on said guide members for engagement with said traction member, at least two of said guide members being grouped together with a station on the transportation path between them, a guide for each of said guide members substantially transverse to said transportation path, a flexible element connecting said guide members, guide means for said flexible element, a drum for winding said flexible element, drive means for said drum, and automatic means for starting and stopping said drive means in dependence upon the movement of said traction member to slide said guide members along said guides to form said traction member into loops the combined total length of which is constant, while the direction of movement of a pair of said guide members is such as to increase the length of the loop formed by one of said two guide members while correspondingly decreasing the length of the loop formed by the other guide member, whereby the speed of the portion of the traction member between said two guide members may be varied independently of the speed of other portions of said traction member, said flexible element connecting said guides being arranged to move the guides simultaneously in opposite directions.

4. A transportation device as set forth in claim 3, in which at least one end of said drum is tapered, said flexible element being wound on said drum in such a way as to place it on said tapered end in both end positions of said guide members.

5. In a transportation device, an endless flexible traction member, rotatable sheaves supporting said traction member, means for driving said traction member, at least two guide members, pulleys rotatably mounted on said guide members for engagement with said traction member, guides for said guide members, a lever having two arms, means connecting each of said two guide members to one end of said arms, means for oscillating said lever, and automatic means for actuating said oscillating means in dependence upon the movement of said traction member to slide said guide members along said guides to form said traction member into loops the combined total length of which is constant, while the direction of movement of a pair of said guide members is such as to increase the length of the loop formed by one of said two guide members while correspondingly decreasing the length of the loop formed by the other guide member, whereby the speed of the portion of the traction member between said two guide members may be varied independently of the speed of other portions of said traction member.

6. In a transportation device, an endless flexible traction member, rotatable sheaves supporting said traction member, means for driving said traction member, at least two guide members, pulleys rotatably mounted on said guide members for engagement with said traction member, guides for said guide members, two synchronized electric motors, means operatively connecting each of said motors to one of said guide members, and automatic means for actuating said motors in dependence upon the movement of said traction member to slide said guide members along said guides to form said traction member into loops the combined total length of which is constant, while the direction of movement of a pair of said guide members is such as to increase the length of the loop formed by one of said two guide members while correspondingly decreasing the length of the loop formed by the other guide member, whereby the speed of the portion of the traction member between said two guide members may be varied independently of the speed of other portions of said traction member.

7. In a transportation device, an endless flexible traction member, rotatable sheaves supporting said traction member, means for driving said traction member, at least two guide members, a slot in each of said guide members, a pulley for engagement with said traction member rotatably and slidably mounted in each of said slots, guide means for said pulleys said guide means being curved at one end, guides for said guide members, and means for sliding said guide members along said guides to form said traction member into loops the combined total length of which is constant, while the direction of movement of a pair of said guide members is such as to increase the length of the loop formed by one of said two guide members while correspondingly decreasing the length of the loop formed by the other guide member, whereby the speed of the portion of the traction member between said two guide members may be varied independently of the speed of other portions of said traction member.

8. In a transportation device, an endless flexible traction member, rotatable sheaves supporting said traction member, means for driving said traction member, at least two guide members, a link member rotatably mounted on each of said guide members, a pulley for engagement with said traction member rotatably mounted on each of said link members, guide means for said pulleys, said guide means being curved at one end, guides for said guide members, and means for sliding said guide members along said guides to form said traction member into loops the combined total length of which is constant, while the direction of movement of a pair of said guide members is such as to increase the length of the loop formed by one of said two guide members while correspondingly decreasing the length of the loop formed by the other guide member, whereby the speed of the portion of the traction member between said two guide members may be varied independently of the speed of other portions of said traction member.

References Cited in the file of this patent

UNITED STATES PATENTS

| | | |
|---|---|---|
| 1,521,229 | Clickner | Dec. 30, 1924 |
| 1,606,166 | Green | Nov. 9, 1926 |
| 1,736,517 | Baker | Nov. 19, 1929 |
| 1,954,349 | Dewey | Apr. 10, 1934 |
| 2,240,214 | Heidelmeyer | Apr. 29, 1941 |
| 2,551,080 | Allen | May 1, 1951 |
| 2,552,743 | Simpson | May 15, 1951 |